M. D. & A. L. BRICE.
POLE COUPLING.
APPLICATION FILED MAR. 31, 1915.

1,147,844.

Patented July 27, 1915.

Witnesses
A. H. Opsahl
E. C. Skinkle

Inventors
Milton D. Brice
Alfred L. Brice
By their Attorneys
Williamson & Merchant

UNITED STATES PATENT OFFICE.

MILTON D. BRICE AND ALFRED L. BRICE, OF MINNEAPOLIS, MINNESOTA.

POLE-COUPLING.

1,147,844.  Specification of Letters Patent.  Patented July 27, 1915.

Application filed March 31, 1915. Serial No. 18,277.

*To all whom it may concern:*

Be it known that we, MILTON D. BRICE and ALFRED L. BRICE, citizens of the United States, residing at Minneapolis, in the county of Hennepin and State of Minnesota, have invented certain new and useful Improvements in Pole-Couplers; and we do hereby declare the following to be a full, clear, and exact description of the invention, such as will enable others skilled in the art to which it appertains to make and use the same.

Our invention has for its object to provide an extremely simple and highly efficient coupler especially adapted for use to connect the pole of a trailer cart to the rear portion of an automobile, and to such ends, generally stated, the invention consists of the novel construction and combination of parts hereinafter described and defined in the claims.

Trailer carts are now very commonly used in connection with automobiles. These carts have forwardly projecting poles, the front ends of which must be detachably secured to a suitable part of the automobile frame, body or running gear, by a coupler which will permit both of vertical and horizontal oscillations of the pole, in respect to the automobile. The vertical oscillation required between the automobile and trailer pole is not very great, but the horizontal oscillation required is very considerable and may be as much as 180 degrees. An efficient pole coupler for the above purpose must meet all of these conditions, and furthermore, should be very simple, strong, durable, should not rattle, and should be capable of very quick connection and disconnection.

Our improved coupler meets all of the above noted requirements, and in a sense is automatic in that it will automatically couple when the coupling element of the pole is properly positioned in respect to the coupling element carried by the automobile.

The coupler is, of course, capable of use to connect a trailing cart to any sort of a propelling vehicle, and such propelling vehicle, so-called, may, as indicated, be an automobile, a horse-drawn vehicle, or even a head member of a train of carts.

In the accompanying drawings which illustrate the invention, like characters indicate like parts throughout the several views.

Figure 1:
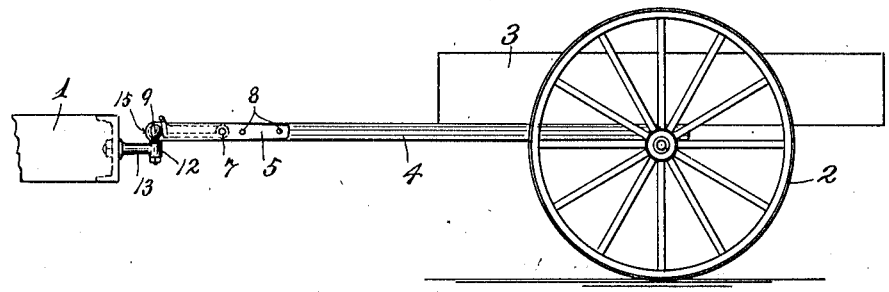
Figure 3:
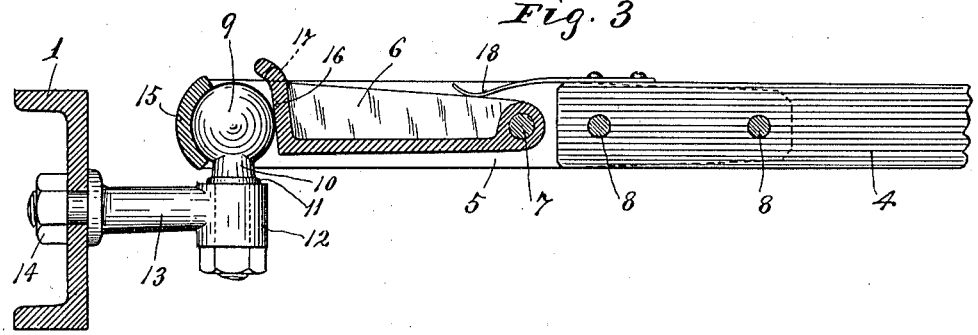
Figure 2:
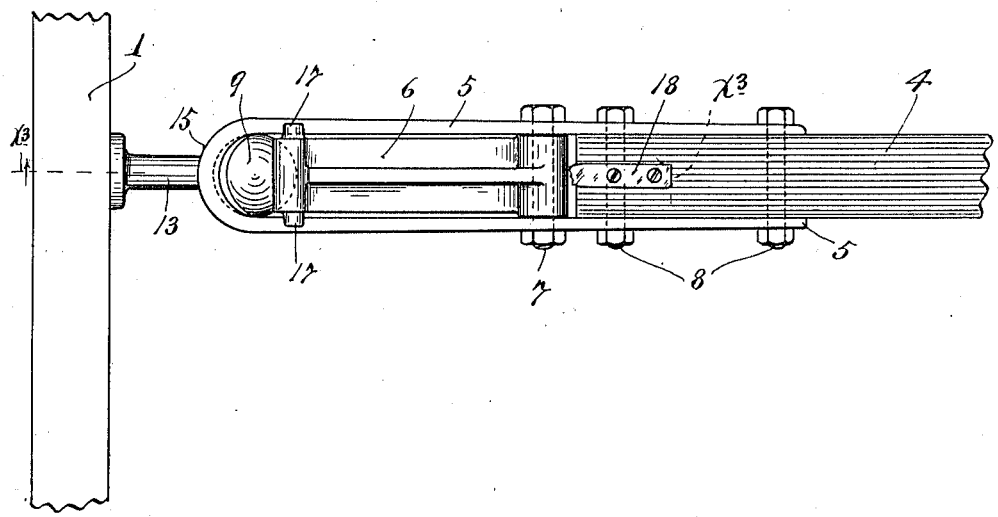

Referring to the drawings: Figure 1 is a side elevation showing our improved pole coupler used to connect the pole of a trailer cart to the frame of an automobile or other propelling vehicle; Fig. 2 is a plan view showing the coupler and portions of the pole and automobile frame on a larger scale than in Fig. 1; and Fig. 3 is a vertical section taken approximately on the line $x^3$—$x^3$ on Fig. 2, some parts being shown in full.

The numeral 1 indicates the rear portion of the frame of an automobile or other so-called propelling vehicle.

The numeral 2 indicates the wheels, the numeral 3 the box and the numeral 4 the pole of a trailing cart.

The improved pole coupler comprises a ball and a socket member. The socket member is made up of two parts, to-wit, a U-shaped body member 5 and a ball clamping dog 6, which latter is pivoted to the said member 5, preferably by a bolt 7. In the preferred arrangement, the prongs of the U-shaped socket member 5 are secured to the front end of the pole 4 of the trailer cart, by means of bolts 8; and the ball member 9 of the coupler is connected to the frame 1. The connection between the pole and the said frame 1, or other part of the other wagon or propelling vehicle, may be made in a great many different ways. Preferably, however, the said ball 9 is provided with a depending threaded stem 10 having a shoulder 11 and this stem is passed through the sleeve-like end 12 of a bracket 13, which latter has a threaded end passed through the web of the frame member 1 and secured thereto by a nut 14. The ball 9 and its stem may be standard for many different applications to different vehicles, and the bracket, which connects the same to the vehicle frame or other part, may be varied according to the requirements of the particular application.

The crotch or bend of the U-shaped socket member 5 is made concavo-convex at 15, so as to fit one side of the ball 9; and the dog 6, at its free end, is provided with an oblique surface 16 that engages the other side of the ball, and under the weight of the said dog, quite tightly presses against the ball, and, in turn, holds the latter seated with the socket concave 15. This positively prevents rattling, but at the same time, leaves the pole free for the required vertical oscillation, and free for horizontal oscillations, in respect to the automobile frame through as much or more than 180 degrees.

To prevent the dog 6 from jumping and releasing the ball under vibrations due to rough roads, it is yieldingly pressed downward not only by gravity, but also by a spring. This spring 18, as shown, is attached at one end to the front end of the pole, and its free forwardly projecting end bears directly on the upper surface of the said dog. The dog 6 is shown as provided at its free end with small projecting stops 17 which limit the downward movement of the dog when the parts of the pole coupler are separated. To uncouple the pole, it is necessary, first to raise the dog 6. When the pole is to be coupled to the ball, it is brought into position to engage the under surface of the dog 6 with the top of the ball, and the said dog is raised by lowering the pole slightly and then the pole is moved rearward until the ball drops into the socket where it will be automatically engaged and held by the dog.

What we claim is:

1. In a pole coupler, the combination with a ball having a vertically projected stem and a support therefor, of a socket member and a support therefor, said socket member having a yieldingly pressed dog coöperating therewith to engage and hold the said ball interlocked thereto, with freedom for vertical and horizontal oscillatory movements.

2. The combination with a propelling vehicle and a trailer having a forwardly projecting pole, of a pole coupler comprising a ball having a downwardly projecting stem supported from said propelling vehicle, a U-shaped socket member secured to said pole and having a concave ball-engaging seat, and a downwardly-pressed dog working between and pivoted to the prongs of said U-shaped member with its free end in position to hold said ball in said concave seat.

3. In a pole coupler, the combination with a ball having a downwardly extended stem, of a U-shaped socket member having a concave ball-engaging seat, and a downwardly-pressed dog working between and pivoted to the prongs of said U-shaped member, and provided at its free end with an oblique ball-engaging surface serving to hold the ball closely pressed in said concave seat, and which dog when raised permits the ball and socket members of the coupler to be connected and disconnected.

4. In a pole coupler, the combination with a ball having a downwardly-extended stem, of a U-shaped socket member having a concave ball-engaging seat, and a downwardly-pressed dog working between and pivoted to the prongs of said U-shaped member, and provided at its free end with an oblique ball-engaging surface serving to hold the ball closely pressed in said concave seat, and which dog when raised permits the ball and socket members of the coupler to be connected and disconnected, the said dog, at its free end having a stop engageable with one of the prongs of said U-shaped member to limit its downward movement when the parts of the coupler are separated.

5. The combination with a propelling vehicle and a trailer having a forwardly projecting pole, of a pole coupler comprising a ball having a downwardly projecting stem supported from said propelling vehicle, a U-shaped socket member secured to said pole and having a concave ball-engaging seat, and a downwardly-pressed dog working between and pivoted to the prongs of said U-shaped member with its free end in position to hold said ball in said concave seat, and a spring anchored in respect to the said U-shaped member and yieldingly pressing downward on the said dog.

In testimony whereof we affix our signatures in presence of two witnesses.

MILTON D. BRICE.
ALFRED L. BRICE.

Witnesses:
BERNICE G. WHEELER,
HARRY D. KILGORE.